United States Patent
Abramczyk et al.

(10) Patent No.: US 12,043,202 B1
(45) Date of Patent: Jul. 23, 2024

(54) SEAT AIRBAG WITH PYROTECHNIC RETRACTOR

(71) Applicant: Ford Global Technologies, LLC, Dearborn, MI (US)

(72) Inventors: Joseph E. Abramczyk, Farmington Hills, MI (US); Zhibing Deng, Northville, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/336,219

(22) Filed: Jun. 16, 2023

(51) Int. Cl.
| B60R 21/2338 | (2011.01) |
| B60N 2/68 | (2006.01) |
| B60R 21/0136 | (2006.01) |
| B60R 21/207 | (2006.01) |
| B60R 21/231 | (2011.01) |

(52) U.S. Cl.
CPC ...... *B60R 21/2338* (2013.01); *B60R 21/0136* (2013.01); *B60R 21/207* (2013.01); *B60R 21/23138* (2013.01); *B60N 2/68* (2013.01); *B60R 2021/23107* (2013.01); *B60R 2021/23146* (2013.01); *B60R 2021/23161* (2013.01); *B60R 2021/23388* (2013.01)

(58) Field of Classification Search
CPC .......... B60R 2021/23146; B60R 2021/23161; B60R 2021/23386; B60R 2021/23388; B60R 21/207; B60R 21/23138; B60R 21/2338
See application file for complete search history.

(56) References Cited

U.S. PATENT DOCUMENTS

| 8,267,424 | B2* | 9/2012 | Tomitaka | B60R 21/231 |
| | | | | 280/730.2 |
| 8,702,123 | B2 | 4/2014 | Mazanek et al. | |
| 9,016,718 | B2* | 4/2015 | Fukawatase | B60R 21/233 |
| | | | | 280/730.2 |
| 9,290,151 | B2* | 3/2016 | Fujiwara | B60R 21/231 |
| 9,428,135 | B1 | 8/2016 | Thomas et al. | |
| 9,428,136 | B2 | 8/2016 | Ishida et al. | |
| 10,300,878 | B2* | 5/2019 | Park | B60R 21/207 |
| 10,336,283 | B2* | 7/2019 | Rickenbach | B60R 21/233 |

(Continued)

FOREIGN PATENT DOCUMENTS

JP 2009280023 A 12/2009

*Primary Examiner* — Laura Freedman
(74) *Attorney, Agent, or Firm* — Frank A. MacKenzie; Bejin Bieneman PLC

(57) ABSTRACT

An assembly includes a first seat and a second seat spaced from the first seat. The assembly includes a first airbag inflatable between the first seat and the second seat from an uninflated position to an inflated position and a second airbag inflatable between the first seat and the second seat from an uninflated position to an inflated position. The first airbag is supported by the first seat in the uninflated position and the inflated position. The second airbag is supported by the second seat in the uninflated position and the inflated position. The second airbag includes a distal end spaced from the second seat in a seat-forward direction. A pyrotechnic retractor is supported by the second seat. The pyrotechnic retractor is operatively coupled to the distal end of the second airbag to move the distal end of the second airbag toward the first airbag.

19 Claims, 7 Drawing Sheets

(56) References Cited

U.S. PATENT DOCUMENTS

| | | | |
|---|---|---|---|
| 10,471,919 B2* | 11/2019 | Faruque | B60R 21/2338 |
| 10,543,800 B2* | 1/2020 | Kwon | B60R 21/233 |
| 10,668,887 B2 | 6/2020 | Fukawatase et al. | |
| 10,899,305 B2* | 1/2021 | Gwon | B60R 21/2338 |
| 10,906,495 B2 | 2/2021 | Nagasawa | |
| 10,926,735 B2* | 2/2021 | Deng | B60R 21/231 |
| 10,960,841 B2* | 3/2021 | Deng | B60R 21/2338 |
| 11,066,036 B2* | 7/2021 | Gwon | B60R 21/231 |
| 11,130,463 B2* | 9/2021 | Parker | B60R 21/23138 |
| 11,267,427 B1* | 3/2022 | Deng | B60R 21/207 |
| 11,364,871 B2* | 6/2022 | Kobayashi | B60R 21/233 |
| 11,383,667 B1* | 7/2022 | Kadam | B60R 21/23138 |
| 11,479,200 B1* | 10/2022 | Gao | B60R 21/20 |
| 11,505,153 B2* | 11/2022 | Fuma | B60R 21/2338 |
| 11,505,155 B1* | 11/2022 | Faruque | B60R 21/2338 |
| 11,529,923 B2* | 12/2022 | Jaradi | B60R 21/231 |
| 11,541,840 B2* | 1/2023 | Jaradi | B60R 21/264 |
| 11,618,404 B1* | 4/2023 | Jaradi | B60R 21/23138 280/730.1 |
| 11,628,795 B1* | 4/2023 | Jaradi | B60R 21/23138 280/728.1 |
| 11,807,166 B2* | 11/2023 | Deng | B60R 21/2338 |
| 11,912,230 B2* | 2/2024 | Faruque | B60R 21/2338 |
| 2019/0248322 A1* | 8/2019 | Herzenstiel | B60R 21/207 |
| 2020/0406855 A1* | 12/2020 | Saito | B60R 21/207 |

* cited by examiner

SEAT AIRBAG WITH PYROTECHNIC RETRACTOR

BACKGROUND

Some seat-mounted airbags are mounted to a seatback and are inflatable along a side of an occupant, specifically along the torso and/or hip of the occupant. The seat-mounted airbag, for example, may be inflatable between the occupants of the vehicle. The seat-mounted airbag controls the kinematics of the occupant in certain vehicle impacts that urge the occupant in a cross-vehicle direction, e.g., certain side vehicle impact.

Vehicles are equipped with airbags which act as supplemental restraints for occupants during certain vehicle impacts. The airbags are located at various fixed positions in passenger compartment of vehicles. Vehicles typically include a driver airbag mounted in the steering wheel, a passenger airbag mounted on a dash in a vehicle-forward direction from the front passenger seat, and side air curtains mounted in the roof rails.

DETAILED DESCRIPTION

Figure 1:
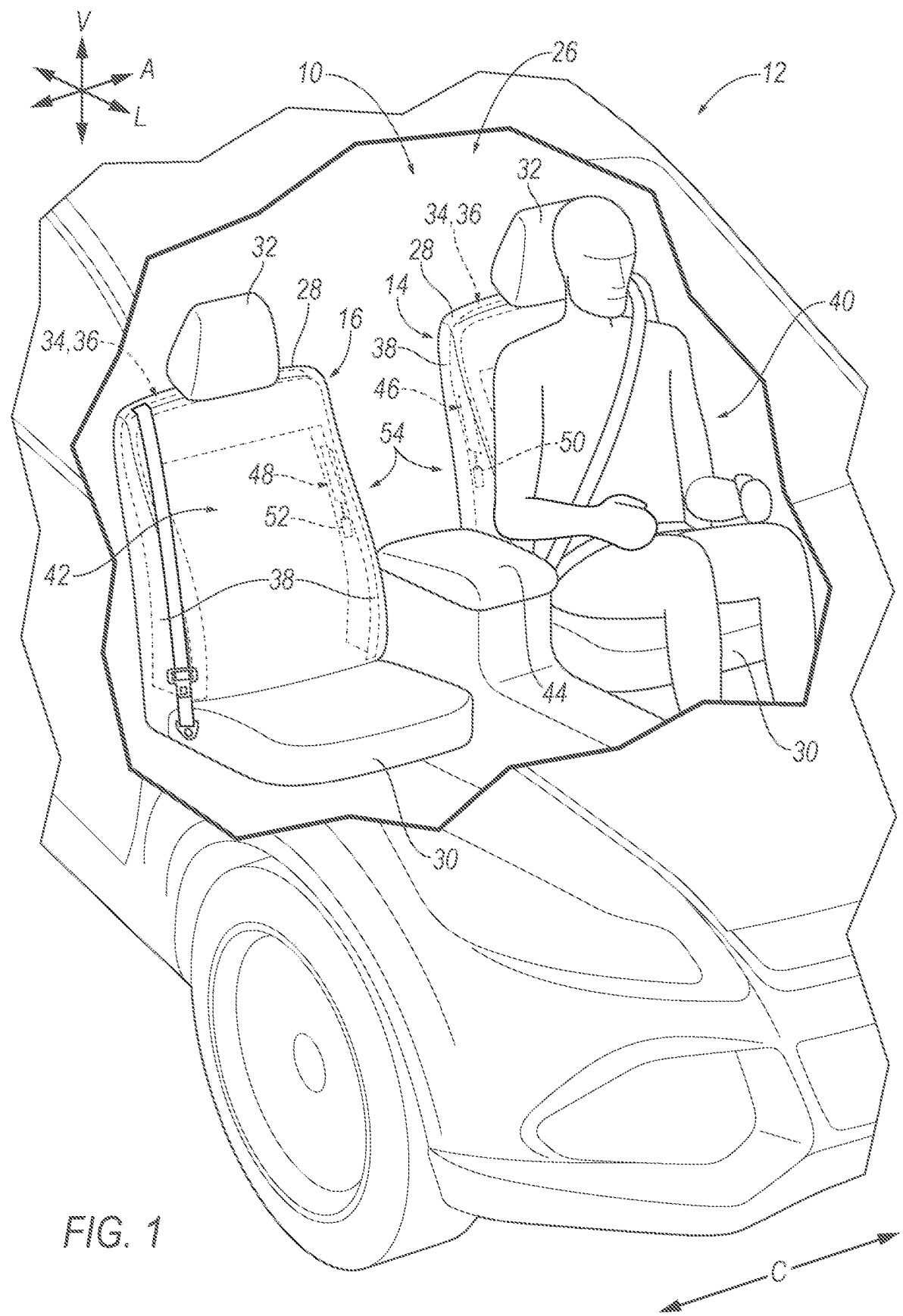
FIG. 1 is a perspective view of a vehicle having a first airbag supported by a first seat and a second airbag supported by a second seat.

An assembly includes a first seat and a second seat spaced from the first seat. The assembly includes a first airbag inflatable between the first seat and the second seat from an uninflated position to an inflated position. The first airbag is supported by the first seat in the uninflated position and the inflated position. The assembly includes a second airbag inflatable between the first seat and the second seat from an uninflated position to an inflated position. The second airbag is supported by the second seat in the uninflated position and the inflated position. The second airbag includes a distal end spaced from the second seat in a seat-forward direction. The assembly includes a pyrotechnic retractor supported by the second seat. The pyrotechnic retractor is operatively coupled to the distal end of the second airbag to move the distal end of the second airbag toward the first airbag.

The assembly may include a tether extending from the pyrotechnic retractor and connected to the distal end of the second airbag. The tether may be retractable from an extended position to a retracted position by the pyrotechnic retractor.

The tether may be configured to move the distal end seat-outboard as the tether moves from the extended position to the retracted position.

The tether may be configured to move the distal end seat-rearward as the tether moves from the extended position to the retracted position.

The second airbag may define an inflation chamber. The tether may be external to the inflation chamber.

The tether may be between the first airbag and the second airbag when the airbags are in the inflated positions.

The second airbag may include a seat-inboard side and a seat-outboard side spaced from the seat-inboard side. The tether may extend along the seat-outboard side in the extended position.

The assembly may include a second tether extending from the second seat to the seat-inboard side of the second airbag. The second tether may be fixed relative to the second seat and the seat-inboard side of the second airbag.

The second airbag may include a flap connected to the distal end. The tether may extend from the flap to the pyrotechnic retractor.

The assembly may include a tether extending from the second seat to the second airbag. The tether may be fixed relative to the second seat and the second airbag.

The assembly may include a middle console between the first seat and the second seat. The first airbag and the second airbag may be inflatable above the middle console.

The second seat may include a seatback. The pyrotechnic retractor may be supported by the seatback of the second seat.

The first seat and the second seat may each include a seatback. The airbags may be inflatable between the seatbacks of the first seat and the second seat.

The seatback of the second seat may include a seatback frame. The pyrotechnic retractor may be supported by the seatback frame.

The seatback frame of the second seat may include a seat-forward side and a seat-rearward side. The pyrotechnic retractor may be fixed to the seat-rearward side of the seatback frame of the second seat.

The assembly may include a tether extending from the seat-forward side of the seatback frame to the second airbag. The tether may be fixed to the seat-forward side of the seatback frame and to the second airbag.

The pyrotechnic retractor may be coupled to the second airbag at a first position and the tether may be fixed to the second airbag at a second position. The first position may be spaced from the second position along the second airbag.

The assembly may include a computer including a processor and a memory storing instructions executable by the processor to identify that an occupant is seated in the first seat, identify that an occupant is seated in the second seat, inflate the first airbag and the second airbag to the inflated positions in response to certain vehicle impacts, and, based on identification of an occupant seated in the first seat and lack of identification of an occupant seated in the second seat, activate the pyrotechnic retractor to move the distal end of the second airbag toward the first airbag.

The instructions may include to not actuate the pyrotechnic retractor based on identification of an occupant seated in the first seat and the second seat.

With reference to the Figures, wherein like numerals indicate like parts throughout the several views, an assembly 10 for a vehicle 12 includes a first seat 14 and a second seat 16 spaced from the first seat 14. The assembly 10 includes a first airbag 18 inflatable between the first seat 14 and the second seat 16 from an uninflated position to an inflated position. The first airbag 18 is supported by the first seat 14 in the uninflated position and the inflated position. The assembly 10 includes a second airbag 20 inflatable between the first seat 14 and the second seat 16 from an uninflated position to an inflated position. The second airbag 20 is supported by the second seat 16 in the uninflated position and the inflated position. The second airbag 20 includes a distal end 22 spaced from the second seat 16 in a seat-forward direction F. The assembly 10 includes a pyrotechnic retractor 24 supported by the second seat 16. The pyrotechnic retractor 24 is operatively coupled to the distal end 22 of the second airbag 20 to move the distal end 22 of the second airbag 20 toward the first airbag 18.

In the event of certain vehicle impacts, e.g., certain side vehicle impacts, the first airbag 18 and the second airbag 20 each inflated to the inflated position. The first airbag 18 and the second airbag 20 may each control the kinematics of any occupant seated in the first seat 14 and the second seat 16. In the event that the second seat 16 does not have an occupant seated in the seat, the pyrotechnic retractor 24 activates to move the distal end 22 of the second airbag 20 toward the first airbag 18. The second airbag 20 acts as a reaction surface for the first airbag 18 as the first airbag 18 controls the kinematics of an occupant seated in the first seat 14.

With reference to FIGS. 1-5, the vehicle 12 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

As described further below, the vehicle 12 includes a body (not numbered) including rockers (not numbered), roof rails, roof beams, pillars, body panels (not numbered), vehicle floor, vehicle roof, etc. The vehicle 12 includes a passenger compartment 26 to house occupants, if any, of the vehicle 12. The passenger compartment 26 may extend across the vehicle 12, i.e., from one side to the other side of the vehicle 12. The passenger compartment 26 includes a front end (not numbered) and a rear end (not shown) with the front end being in front of the rear end during forward movement of the vehicle 12.

The vehicle 12 defines a vehicle-longitudinal axis L extending between a front vehicle end (not numbered) and a rear vehicle end (not shown) of the vehicle 12. The vehicle 12 defines a cross-vehicle axis A extending cross-vehicle from one side to the other side of the vehicle 12. The cross-vehicle direction C is parallel to the cross-vehicle axis A. The vehicle 12 defines a vertical axis V. The vehicle-longitudinal axis L, the cross-vehicle axis A, and the vertical axis V are perpendicular relative to each other.

The vehicle 12 may include one or more seats. The vehicle 12 may include any suitable number of seats. In the example in the Figures, the vehicle 12 includes the first seat 14 and the second seat 16 spaced from each other. In the example shown in the Figures, the first seat 14 and the second seat 16 are spaced cross-vehicle from each other. The seats are supported by a vehicle floor (not numbered). The seats may be arranged in any suitable arrangement in the passenger compartment 26. As in the example shown in the Figures, one or more of the seats may be at the front end of the passenger compartment 26, e.g., a driver seat and/or a passenger seat. In such an example, the first seat 14 may be the driver seat of the vehicle 12 and the second seat 16 may be the passenger seat of the vehicle 12. In other examples, one or more of the seats may be behind the front end of the passenger compartment 26, e.g., at the rear end of the passenger compartment 26. The seats may be movable relative to the vehicle floor to various positions, e.g., movable fore-and-aft and/or cross-vehicle. The seat may be of any suitable type, e.g., a bucket seat.

The seats each include a seatback 28, a seat bottom 30, and a head restraint 32. The head restraint 32 may be supported by and extending upwardly from the seatback 28. The head restraint 32 may be stationary or movable relative to the seatback 28. The seatback 28 may be supported by the seat bottom 30 and may be stationary or movable relative to the seat bottom 30. The seatback 28, the seat bottom 30, and the head restraint 32 may be adjustable in multiple degrees of freedom. Specifically, the seatback 28, the seat bottom 30, and the head restraint 32 may themselves be adjustable. In other words, adjustable components within the seatback 28, the seat bottom 30, and the head restraint 32 may be adjustable relative to each other.

The seats each include a seat frame 34. Specifically, the seatbacks 28 includes a seatback frame 36. FIGS. 2-5 show the seatback frame 36 of the second seat 16. The seatback frame 36 includes a seat-forward side and a seat-rearward side. The seat-forward side faces in the seat-forward direction F and the seat-rearward side faces in a seat-rearward direction R. In other words, the seat-forward side is on a front of the seatback frame 36 and the seat-rearward side is on a back of the seatback frame 36.

The seatback frame 36 may include tubes, beams, etc. Specifically, the seatback frame 36 includes a pair of upright frame members 38. The upright frame members 38 are elongated, and specifically, are elongated in a generally upright direction when the seatback 28 is in a generally upright position. The upright frame members 38 are spaced from each other and the seat frame 34 includes one or more cross-members extending between the upright frame members 38. The upright frame members 38 may include and/or be a part of the seat-forward side and the seat-rearward side. The seat frame 34, including the upright frame members 38, may be of any suitable plastic material, e.g., carbon fiber reinforced plastic (CFRP), glass fiber-reinforced semi-finished thermoplastic composite (organosheet), etc. As another example, some or all components of the seat frame 34 may be formed of a suitable metal, e.g., steel, aluminum, etc.

The seats each include a covering (not numbered) supported on the seat frame 34. The covering may include upholstery, padding, and/or plastic portions. The upholstery may be cloth, leather, faux leather, or any other suitable material. The upholstery may be stitched in panels around the seat frame 34. The padding may be between the covering and the seat frame 34 and may be foam or any other suitable material.

The seatback 28 and the seat bottom 30 define an occupant-seating area 40, 42 of each of the seats. For example, the first seat 14 defines a first occupant-seating area 40 and the second seat 16 defines a second occupant-seating area 42. The occupant-seating areas 40, 42 are the areas occupied by an occupant when properly seated on the seat bottom 30 and the seat back of the seats. The occupant-seating areas 40, 42 are in the seat-forward direction F of the seatback 28 and above the seat bottom 30. In the example shown in the Figures, the occupant-seating areas 40, 42 face the front end of the passenger compartment 26. The occupant-seating areas 40, 42 may be seat-forward of the seat-forward side of the seatback frame 36. The seat-forward side of the seatback frame 36 is between the occupant-seating areas 40, 42 of the seats and the seat-rearward side.

With continued reference to FIGS. 1-5, the vehicle 12 includes a middle console 44 between the first seat 14 and the second seat 16. Specifically, the middle console 44 may be supported by the vehicle floor between the seats. The seats may each be vehicle-outboard of the middle console 44. The seats are spaced from each other by the middle console 44. The middle console 44 is adjacent each of the seats.

The middle console 44 includes a fixed portion (not numbered) that is fixed relative to the passenger compartment 26. The middle console 44, specifically the fixed portion, may have sides that face laterally, i.e., face in the cross-vehicle direction C. The sides are adjacent the seats and the seats may be spaced from or may abut the sides. The fixed portion may have a forward side (not numbered) and a rearward side (not numbered) each extending in the cross-vehicle direction C from one side to the other side. Specifically, the forward side is spaced vehicle-forward from the rearward side. The forward side faces vehicle-forward and the rearward side faces vehicle-rearward. The middle console 44 may be formed of a rigid material, e.g., plastic.

The vehicle 12 may include one or more airbag assemblies 46, 48. Specifically, the vehicle 12 includes a first airbag assembly 46 and a second airbag assembly 48. Each of the airbag assemblies 46, 48 includes an airbag, an inflator, and may include a housing (not shown). The first airbag assembly 46 includes the first airbag 18 and the second airbag assembly 48 includes the second airbag 20.

Each of the airbag assemblies 46, 48 is supported by one of the seats. Specifically, each of the airbag assemblies 46, 48 is fixed to one of the seats, e.g., to the seatbacks 28. In the example shown in the Figures, the vehicle 12 includes the first airbag assembly 46 supported by the first seat 14 and the second airbag assembly 48 supported by the second seat 16. Specifically, the first airbag assembly 46 is fixed to the seatback 28 of the first seat 14 and the second airbag assembly 48 is fixed to the seatback 28 of the second seat 16. The airbag assemblies 46, 48 are fixed on vehicle-inboard sides 54 of the seats such that the airbags 18, 20 inflate between the seats, as discussed further below.

As discussed above, each airbag assembly includes an inflator. Specifically, the first airbag assembly 46 includes a first inflator 50 and the second airbag assembly 48 includes a second inflator 52. The inflators 50, 52 are fluidly connected to each of the airbags 18, 20. The inflators 50, 52 expands the airbags 18, 20 with inflation medium, such as a gas, to move the airbags 18, 20 from uninflated positions to inflated positions. The inflators 50, 52 may be, for example, a pyrotechnic inflator that ignites a chemical reaction to generate the inflation medium, a stored gas inflator that releases (e.g., by a pyrotechnic valve) stored gas as the inflation medium, or a hybrid.

As discussed above, the first airbag assembly 46 is fixed to the first seat 14. Specifically, the first airbag 18 is fixed to the first seat 14. In other words, the first airbag 18 is supported by the first seat 14 in the uninflated position and the inflated position. The first airbag 18 is fixed to the seatback 28 of the first seat 14. The first airbag 18 is fixed to the seatback frame 36 of the first seat 14. The first airbag 18 may be fixed to the upright frame member 38 of the seatback frame 36. The first airbag 18 is fixed to a vehicle-inboard side 54 of the seatback 28. For example, the first airbag 18 is vehicle-inboard of the first occupant-seating area 40.

The first airbag 18 inflates from the uninflated position to the inflated position. In the uninflated position, the first airbag 18 is concealed under the covering of the seatback 28. Specifically, the covering may include a tear seam (not shown) aligned with the first airbag assembly 46. The first airbag assembly 46 and the tear seam are positioned such that the first airbag 18 breaks through the tear seam as the first inflator 50 inflates the first airbag 18. In other words, the covering on one side of the tear seam separates from the covering on the other side of the tear seam when the force is above a threshold magnitude. The threshold magnitude may be chosen to be greater than forces from, e.g., inadvertent pushing against the first seat 14 by an occupant but be less than forces from the inflation of the first airbag 18. The tear seam may be, for example, a line of perforations through the covering, a line of thinner covering material than the rest of the covering, etc.

In the inflated position, the first airbag 18 extends from the seatback 28 of the first seat 14. Specifically, the first airbag 18 inflates in the seat-forward direction F from the seatback 28. The first airbag 18 inflates adjacent the first occupant-seating area 40. Specifically, the first airbag 18 inflates vehicle-inboard of the first occupant-seating area 40. The first airbag 18 inflates between the first seat 14 and the second seat 16 in a cross-seat direction SC. Specifically, the first airbag 18 inflates between the seatbacks 28 of the first seat 14 and the second seat 16 in the cross-seat direction SC. In some examples, such as shown in the Figures, the first airbag 18 may inflate above the middle console 44. In other examples, the first airbag 18 may inflate, at least partially, between the middle console 44 and the first seat 14, e.g., between the middle console 44 and the first occupant-seating area 40.

As discussed above, the second airbag assembly 48 is fixed to the second seat 16. Specifically, the second airbag 20 is fixed to the second seat 16. In other words, the second airbag 20 is supported by the first seat 14 in the uninflated position and the inflated position. The second airbag 20 is fixed to the seatback 28 of the second seat 16. The second airbag 20 is fixed to the seatback frame 36 of the second seat 16. The second airbag 20 may be fixed to the upright frame member 38 of the seatback frame 36. The second airbag 20 is fixed to the vehicle-inboard side 54 of the seatback 28. For example, the second airbag 20 is vehicle-inboard of the second occupant-seating area 42.

The second airbag 20 inflates from the uninflated position to the inflated position. In the uninflated position, the second airbag 20 is concealed under the covering of the seatback 28. Specifically, the covering may include a tear seam (not shown) aligned with the second airbag assembly 48. The second airbag assembly 48 and the tear seam are positioned such that the second airbag 20 breaks through the tear seam as the second inflator 52 inflates the second airbag 20. In other words, the covering on one side of the tear seam separates from the covering on the other side of the tear seam when the force is above a threshold magnitude. The threshold magnitude may be chosen to be greater than forces from, e.g., inadvertent pushing against the second seat 16 by an occupant but be less than forces from the inflation of the second airbag 20. The tear seam may be, for example, a line of perforations through the covering, a line of thinner covering material than the rest of the covering, etc.

In the inflated position, the second airbag 20 inflates from the seatback 28 of the second seat 16. The second airbag 20 inflates adjacent the second occupant-seating area 42. Specifically, the second airbag 20 inflates vehicle-inboard of the second occupant-seating area 42. The second airbag 20 inflates between the first seat 14 and the second seat 16 in the cross-seat direction SC. Specifically, the second airbag 20 inflates between the seatbacks 28 of the first seat 14 and the second seat 16 in the cross-seat direction SC. The second airbag 20 is between the second seat 16 and the first airbag 18 in the cross-seat direction SC. Specifically, the second airbag 20 is between the seatback 28 of the second seat 16 and the first airbag 18 in the cross-seat direction SC. The second airbag 20 is between the second occupant-seating area 42 and the first airbag 18 in the cross-seat direction SC. The first airbag 18 is between the first seat 14 and the second airbag 20 in the cross-seat direction SC. Specifically, the first airbag 18 is between the seatback 28 of the first seat 14 and the second airbag 20 in the cross-seat direction SC. The first airbag 18 is between the first occupant-seating area 40 and the second airbag 20 in the cross-seat direction SC.

In some examples, such as shown in the Figures, the second airbag 20 may inflate above the middle console 44. In other examples, the second airbag 20 may inflate, at least partially, between the middle console 44 and the second seat 16, e.g., between the middle console 44 and the second occupant-seating area 42.

The second airbag 20 extends from the seatback 28 of the first seat 14. Specifically, the second airbag 20 is elongated along an axis B. The second airbag 20 inflates in the seat-forward direction F from the seatback 28. The second airbag 20 includes a first end 56 and the distal end 22. The first end 56 of the second airbag 20 is proximate to the seatback 28 of the second seat 16. The distal end 22 of the second airbag 20 is distal to the seatback 28. Specifically, the distal end 22 is spaced from the first end 56 in the seat-forward direction F. In other words, the distal end 22 is spaced from the second seat 16 in the seat-forward direction F in the inflated position. The first end 56 of the airbag is fixed to the seatback 28 and the second airbag 20 extends from the first end 56 to the distal end 22 in the seat-forward direction F. In some examples, the distal end 22 of the second airbag 20 may be aligned with the axis B, e.g., when the first seat 14 and the second seat 16 each include an occupant. In other examples, the distal end 22 is movable toward the first airbag 18 and the distal end 22 is offset from the axis B, e.g., when the first seat 14 includes an occupant and the second seat 16 is empty. The distal end 22 may move seat-outboard in the cross-vehicle direction C from the second seat 16 and the distal end 22 may move seat-rearward from the second seat 16.

The second airbag 20 may include a seat-inboard side 58 and a seat-outboard side 60 spaced from the seat-inboard side 58. Each of the seat-inboard side 58 and the seat-outboard side 60 extend from the first end 56 to the distal end 22 of the second airbag 20. The seat-inboard side 58 may be seat-inboard of the seat-outboard side 60. In other words, the seat-inboard side 58 is adjacent the second occupant-seating area 42. Specifically, the seat-inboard side 58 is between the seat-outboard side 60 and the second occupant-seating area 42. The seat-outboard side 60 is between the seat-inboard side 58 and the first airbag 18 in the cross-seat direction SC.

The second airbag 20 includes a top portion 62 and a bottom portion 64 spaced from the top portion 62 along the vertical axis V. The top portion 62 extends from the first end 56 to the distal end 22 and from the seat-inboard side 58 to the seat-outboard side 60. The bottom portion 64 extends from the first end 56 to the distal end 22 and from the seat-inboard side 58 to the seat-outboard side 60.

The second airbag 20 defines an inflation chamber 66. Specifically, the top portion 62, the bottom portion 64, the first end 56, the distal end 22, the seat-inboard side 58, and the seat-outboard side 60 define the inflation chamber 66. The inflation chamber 66 fills with inflation medium from the second inflator 52 of the second airbag assembly 48.

The first airbag 18 and the second airbag 20 may each be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

As discussed further below, a vehicle computer 68 and occupancy sensors 70 of the vehicle 12 identify occupancy of the first seat 14 and the second seat 16. In some examples, shown in FIGS. 2 and 4, an occupant may be seated in the first seat 14 and no occupant may be seated in the second seat 16, i.e., the second seat 16 is empty. In such an example, in the event of certain vehicle impacts, the second airbag 20 may be movable relative to the first airbag 18 to act as a reaction surface to the first airbag 18 as the first airbag 18 controls the kinematics of the occupant of the first seat 14. Specifically, the distal end 22 of the second airbag 20 is movable toward the first airbag 18 to act as a reaction surface to the first airbag 18. In other words, the distal end 22 moves seat-outboard and seat-rearward relative to the second seat 16. In other examples, shown in FIGS. 1, 3, and 5, an occupant may be seated in both the first seat 14 and the second seat 16, i.e., an occupant is seated in each of the first seat 14 and the second seat 16. In such an example, the distal end 22 of the second airbag 20 remains aligned with the axis B.

Figure 2:
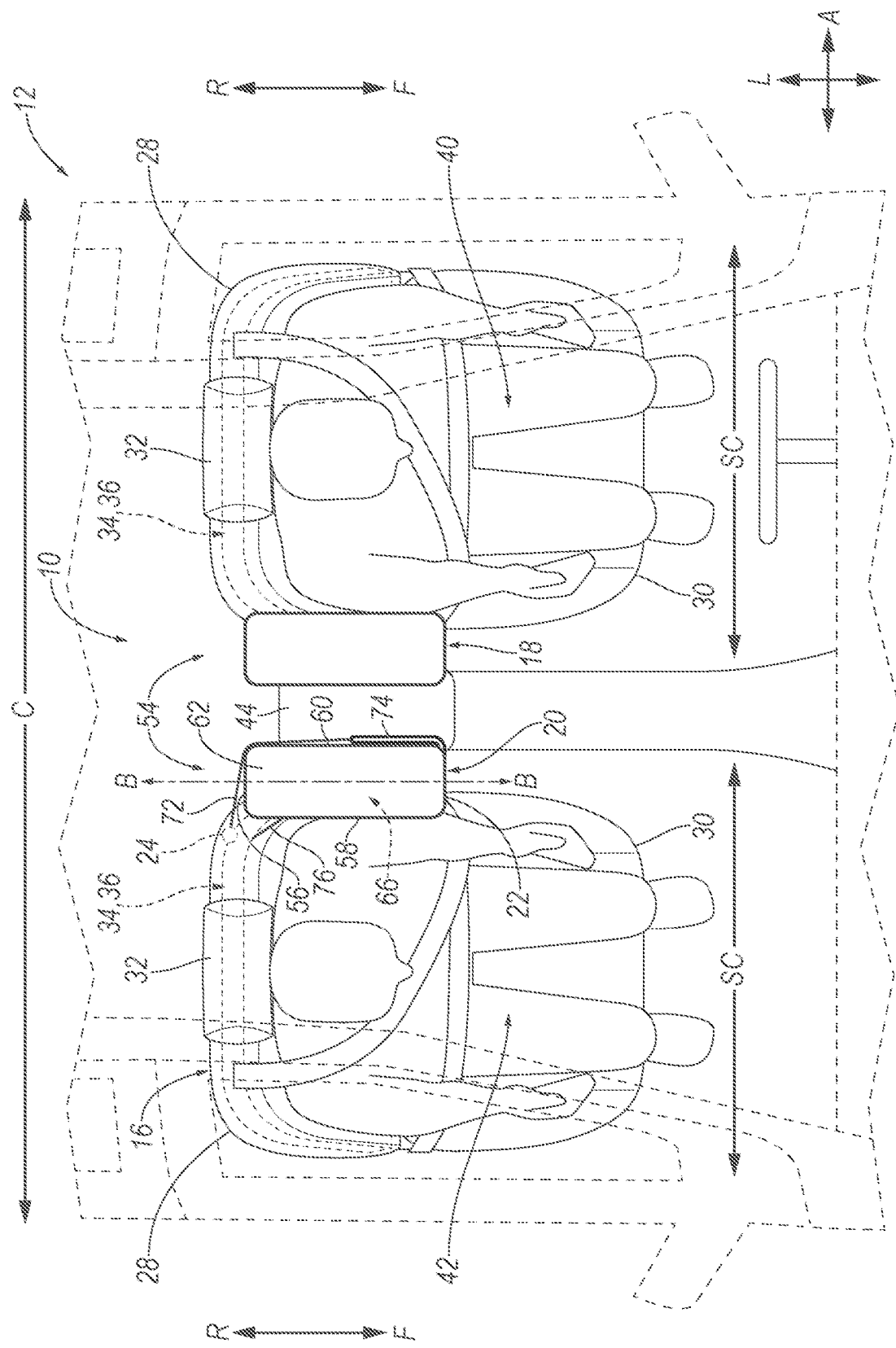
FIG. 2 is a plan view of the vehicle with the first airbag and the second airbag in inflated positions and occupants seated in each of the first seat and the second seat.
Figure 3:
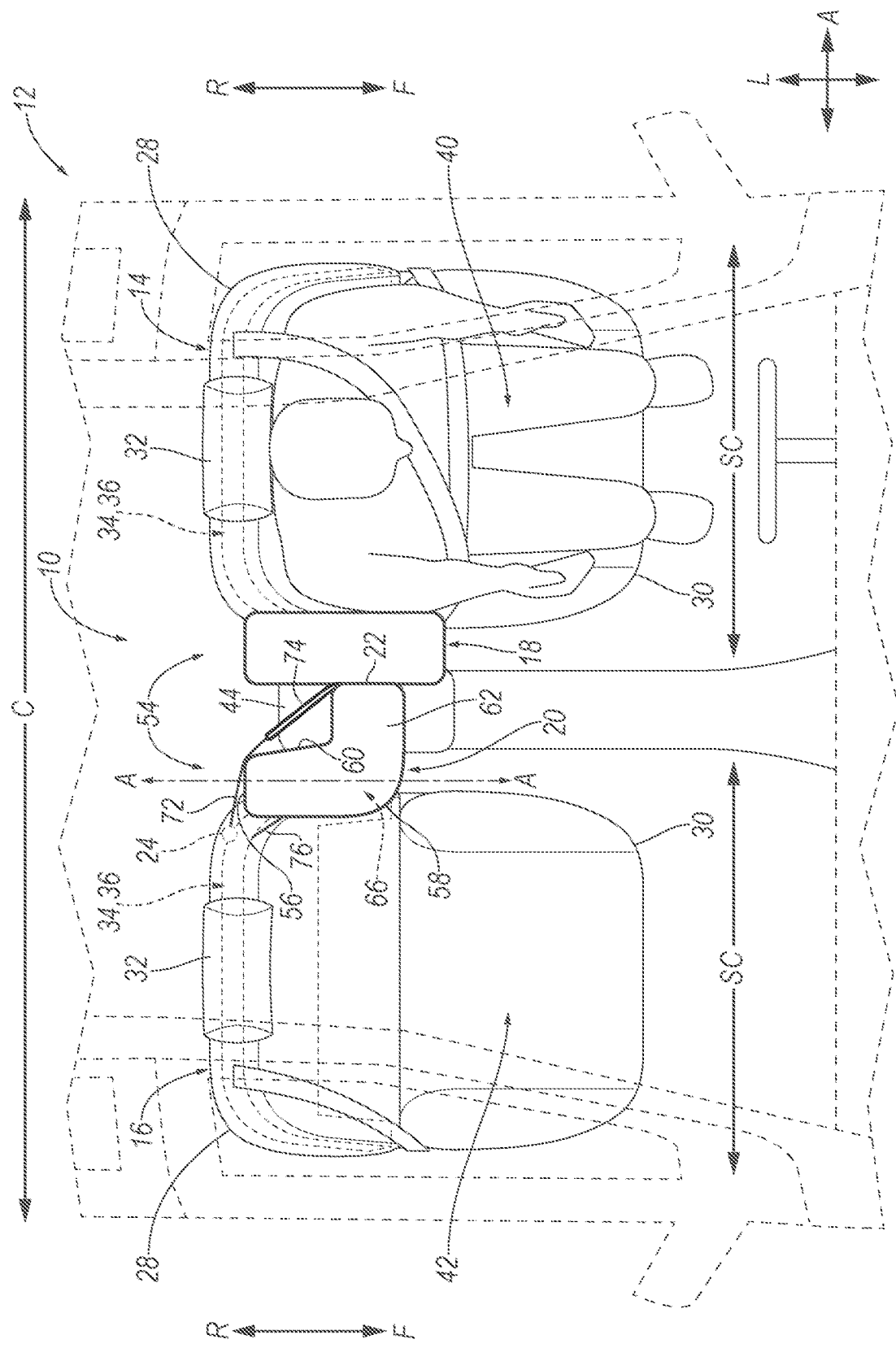
FIG. 3 is a plan view of the vehicle with the first airbag and the second airbag in the inflated positions and an occupant only in the first seat.
Figure 4:
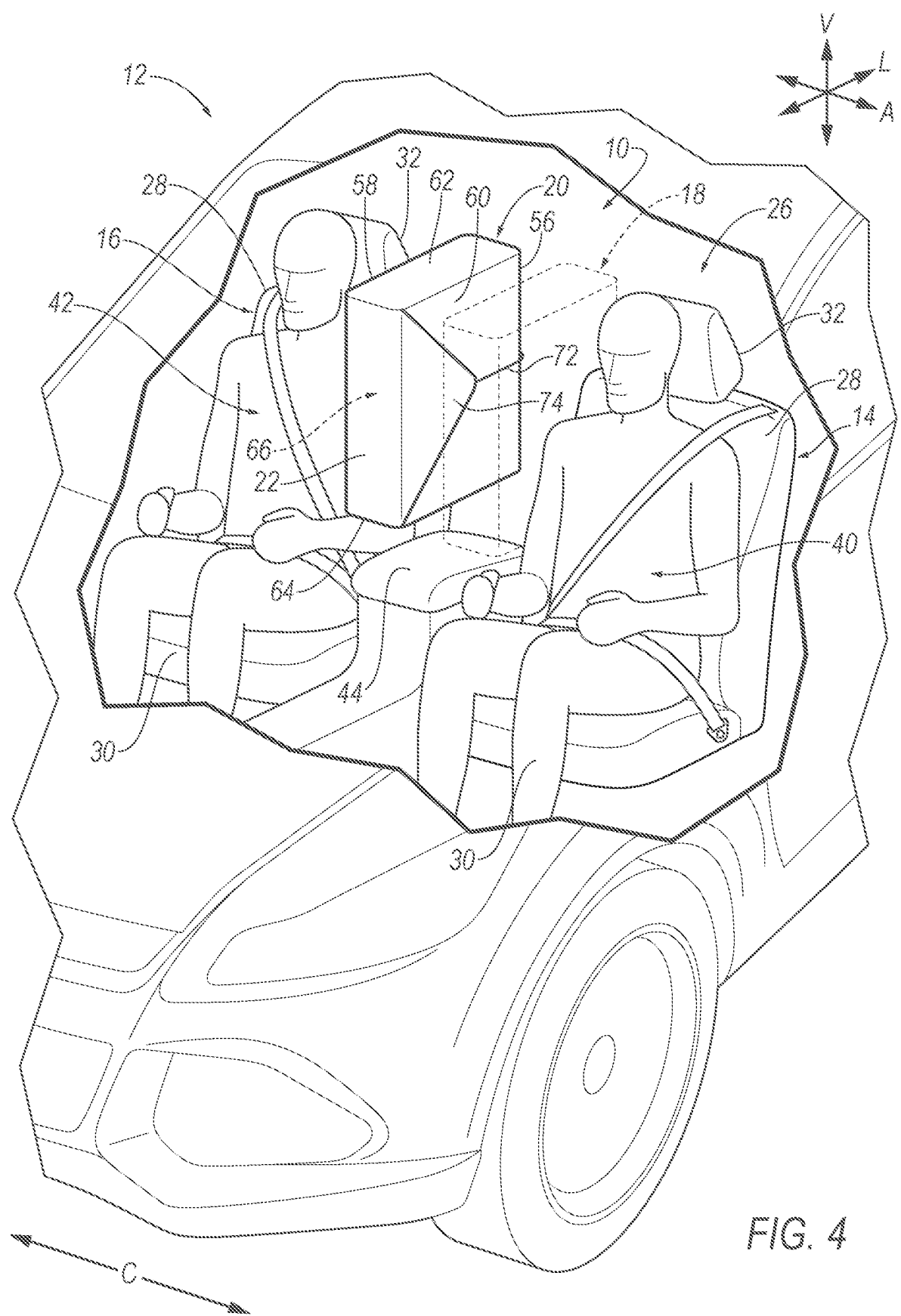
FIG. 4 is a perspective view of the first airbag and the second airbag in inflated positions and occupants seated in both the first seat and the second seat.
Figure 5:
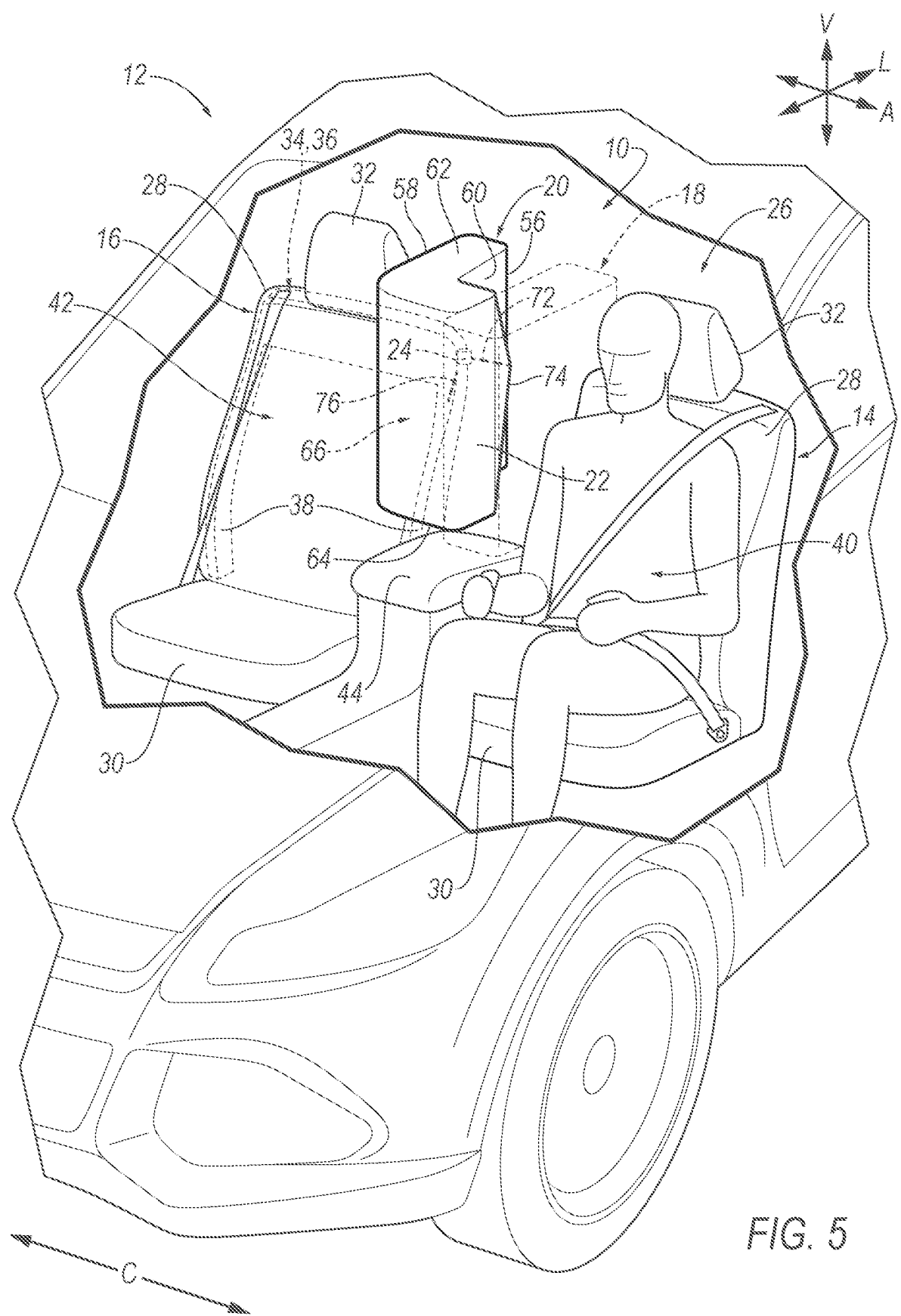
FIG. 5 is a perspective view of the first airbag and the second airbag in the inflated positions and an occupant only in the first seat.

As shown in FIGS. 2, 3 and 5, the vehicle 12 includes the pyrotechnic retractor 24 supported by the second seat 16. Specifically, the pyrotechnic retractor 24 is fixed to the second seat 16. The pyrotechnic retractor 24 may be supported by the seatback 28 of the second seat 16, e.g., the seatback frame 36. For example, as shown in FIGS. 2, 3, and 5, the pyrotechnic retractor 24 may be supported by the seat-rearward side of the seatback frame 36. Specifically, the pyrotechnic retractor 24 may be fixed to the seat-rearward side of the seatback frame 36 of the second seat 16. The pyrotechnic retractor 24 may be supported by, i.e., fixed to, the seat-rearward side of the upright frame member 38 of the seatback frame 36. In other examples, the pyrotechnic retractor 24 may be fixed at any suitable location on the second seat 16.

The pyrotechnic retractor 24 is connected to the second airbag 20. Specifically, the pyrotechnic retractor 24 may be connected to one or more locations of the second airbag 20. The pyrotechnic retractor 24 is operatively coupled to the second airbag 20 to move the second airbag 20 toward the first airbag 18 in the event of certain vehicle impacts where an occupant is seated in the first seat 14 and no occupant is seated in the second seat 16. Specifically, the pyrotechnic retractor 24 is operatively coupled to the distal end 22 of the second airbag 20 to move the distal end 22 toward the first airbag 18. In the event of certain vehicle impacts and in the event that an occupant is only seated in the first seat 14, the pyrotechnic retractor 24 activates to move the distal end 22 of the second airbag 20 toward the first airbag 18. The pyrotechnic retractor 24 may be lockable relative to the seatback 28. Specifically, when the distal end 22 is moved toward the second airbag 20, the pyrotechnic retractor 24 locks to maintain the distal end 22 adjacent the first airbag 18. In the event of certain vehicle impacts, the pyrotechnic retractor 24 moves the distal end 22 of the second airbag 20 toward the seatback 28 as the second airbag 20 moves to the inflated position.

With reference to FIGS. 2-5, the assembly 10 includes a first tether 72 extending from the pyrotechnic retractor 24 to the second airbag 20. Specifically, the first tether 72 extends from the pyrotechnic retractor 24 and is connected to the distal end 22 of the second airbag 20. The first tether 72 is external to the inflation chamber 66. In other words, the first tether 72 is not inside the inflation chamber 66, i.e., the first tether 72 is between the second airbag 20 and the remainder of the passenger compartment 26 when the second airbag 20 is in the inflated position. The first tether 72 may be aligned with the tear seam of the second seat 16 when the second seat 16 is in the uninflated position. In other words, in the uninflated position, the first tether 72 is concealed by the covering of the second seat 16. As the second airbag 20 inflates to the inflated position, the first tether 72 elongates between the second seat 16 and the second airbag 20. The pyrotechnic retractor 24 is operatively coupled to the first tether 72 to move the distal end 22 of the second airbag 20 toward the first airbag 18 during certain vehicle impacts and depending on occupancy of the first seat 14 and the second seat 16. In other words, the first tether 72 may be retractably coupled to the pyrotechnic retractor 24 to move the first tether 72 from an extended position to a retracted position. A length of the first tether 72 may change relative to the seatback 28 and the second airbag 20 as the tether moves from the extended position to the retracted position.

The first tether 72 is in the retracted position when the second airbag 20 is in the inflated position and an occupant is only seated in the first seat 14. In the event of certain vehicle impacts and when no occupant is seated in the second seat 16, the pyrotechnic retractor 24 may retract the first tether 72 toward the seatback 28 to move the distal end 22 of the second airbag 20 toward the first airbag 18. The first tether 72 is configured to move the distal end 22 seat-outboard and seat-rearward as the first tether 72 moves from the extended position to the retracted position. When the airbags 18, 20 are in the inflated positions and the tether is in the retracted position, the distal end 22 of the second airbag 20 may abut the first airbag 18 to act as a reaction surface for the first airbag 18. Once the first tether 72 is in the retracted position, the pyrotechnic retractor 24 is lockable to maintain the distal end 22 of the second airbag 20 adjacent the first airbag 18. In other words, the pyrotechnic retractor 24 is lockable to maintain the first tether 72 in the retracted position.

The first tether 72 remains in the extended position when the second airbag 20 is in the inflated position and an occupant is seated in each of the first seat 14 and the second seat 16. In the extended position, the first tether 72 extends along and around the exterior of the second airbag 20. Specifically, the first tether 72 extends from the pyrotechnic retractor 24 and along the first end 56 and along the seat-outboard side 60 when the tether is in the extended position. The seat-outboard side 60 and the inflation chamber 66 are between the first tether 72 and the seat-inboard side 58 of the second airbag 20. The seat-inboard side 58 is between the first tether 72 and the second occupant-seating area 42. The first tether 72 is between the first airbag 18 and the second airbag 20 in the extended position. Specifically, the first tether 72 is between the seat-outboard side 60 of the second airbag 20 and the first airbag 18.

As set forth above, the first tether 72 may be connected to the distal end 22 of the second airbag 20. Specifically, the first tether 72 may be operatively connected to the distal end 22 to move the distal end 22 toward the first airbag 18 when the first tether 72 is retracted. The first tether 72 may be connected directly to the distal end 22 or indirectly to the distal end 22, i.e., connected to the distal end 22 through components other than the second airbag 20 itself. In the examples shown in the Figures, the first tether 72 is indirectly connected to the distal end 22 of the second airbag 20 through components other than the second airbag 20 itself. In other words, one or more components other than panels of the airbag 20 may be between the first tether 72 and the distal end 22 when the first tether 72 is indirectly connected to the distal end 22. In the example shown in the Figures, a flap 74 is between the first tether 72 and the second airbag 20. In such an example, the first tether 72 extends from pyrotechnic retractor 24 to the flap 74 and the flap 74 extends from the first tether 72 to the distal end 22 of the second airbag 20. The flap 74 may be of any suitable shape. The flap 74 is configured to distribute the load of the first tether 72 along the distal end 22. For example, the flap 74 in the Figures is triangular in shape and extends vertically at least along half of the vertical height of the distal end 22 in the inflated position. For example, in the example shown in the Figures, the flap 74 may extend vertically along the entirety of the distal end 22. Specifically, in such an example, the flap 74 may extend from the top portion 62 to the bottom portion 64 along the distal end 22. The flap 74 extends from the distal end 22 to the first tether 72. The flap 74 extending along the entirety of the distal end 22 allows the tether to pull the entirety of the distal end 22 evenly toward the first airbag 18. The flap 74 is fixed to the distal end 22 and moves with the distal end 22. As an example, the flap 74 may be fixed directly to the distal end 22 with, for example, stitching, adhesive, bonding, etc. The flap 74 may be fabric. As an example, the same type of material as the second airbag 20.

In other examples, not shown in the Figures, the first tether 72 may be connected directly to the distal end 22. In other words, when the first tether 72 is connected directly to the distal end 22, the tether extends from the pyrotechnic retractor 24 to the distal end 22 with no other components between the tether and the distal end 22.

The pyrotechnic retractor 24 include a pyrotechnic charge that activate the pyrotechnic retractor 24 to move the distal end 22 of the second airbag 20 toward the first airbag 18. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic retractor 24 may be any suitable type such as a rotary actuator, in which the pyrotechnic charge rotates a shaft connected to the first tether 72 such that the first tether wraps around the shaft; a piston linkage, in which the pyrotechnic charge for example, drives a piston attached to the first tether 72; a ball-in-tube linkage, in which an pyrotechnic charge propels a ball or balls over a cogwheel connected to the first tether 72; a mechanical linkage, in which a compressed spring attached to the first tether 72 is released; or any other suitable type.

The vehicle 12 includes a second tether 76 extending from the second seat 16 to the second airbag 20. Specifically, the second tether 76 extends from the seatback 28 of the second seat 16, e.g., the seatback frame 36, of the second seat 16 to the seat-inboard side 58 of the second airbag 20. The second tether 76 extends from the seat-forward side of the seatback frame 36 to the second airbag 20, i.e., the seat-inboard side 58 of the second airbag 20. In other words, the second tether 76 extends from the seatback frame 36 at a position spaced from the pyrotechnic retractor 24, i.e., the pyrotechnic retractor 24 is fixed to the seat-rearward side of the seatback frame 36 and the second tether 76 extends from the seat-forward side of the seatback frame 36. The second tether 76 is external to the inflation chamber 66 of the second airbag 20. In other words, the second tether 76 is not inside the inflation chamber 66 of the second airbag 20.

The second tether 76 is fixed relative to the second airbag 20 and the second airbag 20. The second tether 76 is fixed relative to the second seat 16 and the seat-inboard side 58 of the airbag. Specifically, the second tether 76 is fixed to the seat-forward side of the seatback frame 36 and the seat-inboard side 58 of the second airbag 20. The second tether 76 is fixed to the seat-inboard side 58 of the of the second airbag 20 at a first position and the first tether 72 is fixed to the second airbag 20 at a second position. The first position and the second position are at different locations of the second airbag 20. In other words, the first tether 72 and the second tether 76 are not fixed to the same position on the second airbag 20. The first position and the second position are spaced from each other along the second airbag 20.

The second tether 76 is not retractable relative to the seatback 28 or the second airbag 20. Specifically, a length of the second tether 76 does not change depending on the occupancy of the first seat 14 and the second seat 16. The length of the second tether 76 does not change if there is an occupant in the second seat 16 nor if there is no occupant in the second seat 16.

Figure 6:
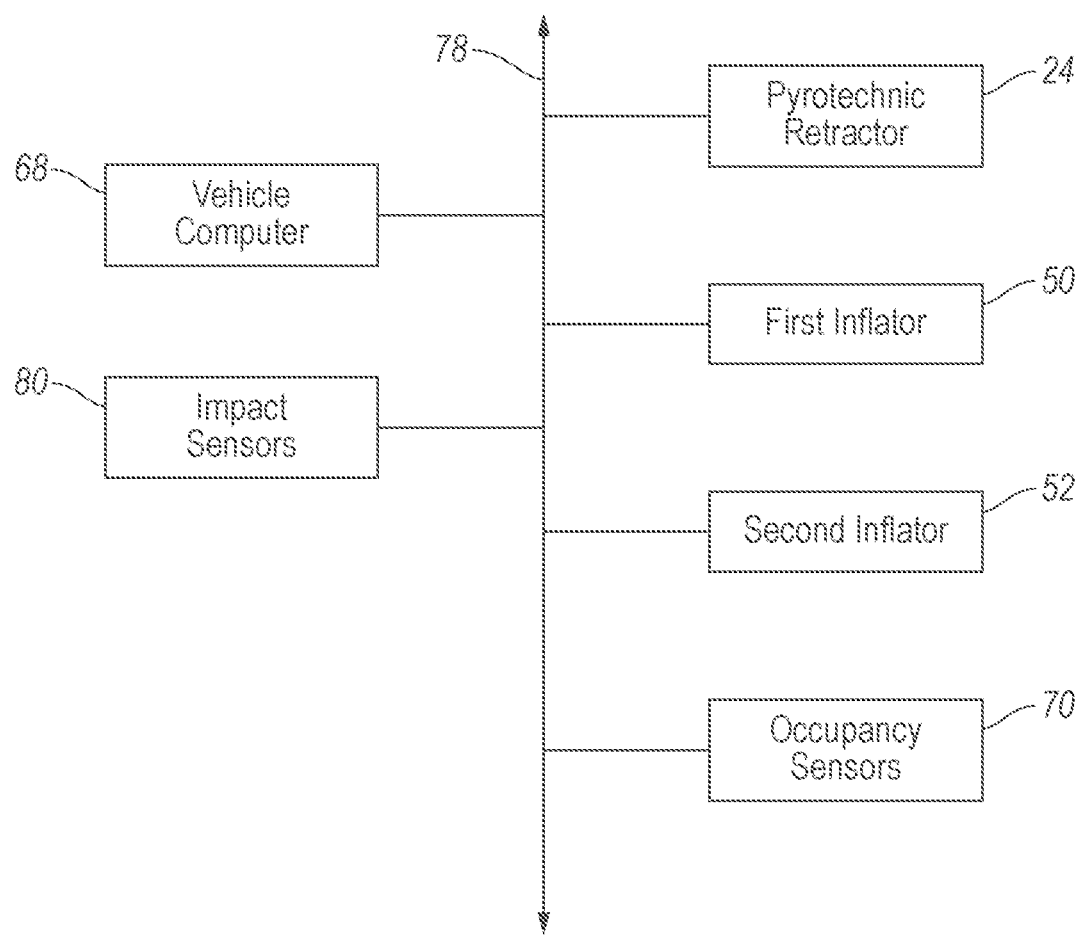
FIG. 6 is a block diagram of a vehicle communication network of the vehicle.

With continued reference to FIG. 6, the vehicle computer 68 includes a processor and a memory storing instructions executable by the processor. The memory includes one or more forms of computer readable media, and stores instructions executable by the vehicle computer 68 for performing various operations, including as disclosed herein. The vehicle computer 68 may be a restraints control module. The vehicle computer 68 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 68 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 68.

The vehicle computer 68 is generally arranged for communications on a vehicle communication network 78 that can include a bus in the vehicle 12 such as a controller area network CAN or the like, and/or other wired and/or wireless mechanisms. Alternatively or additionally, in cases where the vehicle computer 68 actually comprises a plurality of devices, the vehicle communication network 78 may be used for communications between devices represented as the vehicle computer 68 in this disclosure. Further, as mentioned below, various controllers and/or sensors may provide data to the vehicle computer 68 via the vehicle communication network 78.

With reference to FIG. 6, the vehicle 12 may include at least one impact sensor 80 for sensing certain vehicle impacts (e.g., impacts of a certain magnitude, direction, etc.), and the vehicle computer 68 in communication with the impact sensor 80 and the inflators 50, 52. The vehicle computer 68 may activate the inflators 50, 52, e.g., provide an impulse to a pyrotechnic charge of the inflators 50, 52 when the impact sensor 80 senses certain vehicle impacts. The impact sensor 80 may be configured to sense certain vehicle impacts prior to impact, i.e., pre-impact sensing. The impact sensor 80 may be in communication with the vehicle computer 68. The impact sensor 80 is configured to detect certain vehicle impacts. In other words, a "certain vehicle impact" is an impact of the type and/or magnitude for which the first airbag 18 and the second airbag 20 move to the inflated position, i.e., "certain" indicates the type and/or magnitude of the impact. The type and/or magnitude of such "certain vehicle impacts" may be prestored in the vehicle computer 68, e.g., a restraints control module. The impact sensor 80 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 80 may be located at numerous points in or on the vehicle 12.

The vehicle 12 may include at least one occupancy sensor 70. The occupancy sensor 70 is configured to detect occupancy of the first seat 14 and the second, e.g., detect an occupant in the occupant-seating areas 40, 42. The occupancy sensor 70 may be visible-light or infrared cameras directed at the seats, weight sensors supported by the seat bottoms 30, sensors detecting whether a seatbelt assembly (not numbered) for the first seat 14 and the second seat 16 are buckled, or other suitable sensors. The occupancy sensor 70 provides data to the computer specifying whether the first seat 14 and/or the second seat 16 is occupied or unoccupied and information regarding the type of occupant. As one example, the vehicle 12 may include one occupancy sensor 70 for each occupant-seating areas 40, 42. As another example, the vehicle 12 may include one occupancy sensor 70 that is designed to individually detect occupancy of each occupant-seating areas 40, 42.

Figure 7:
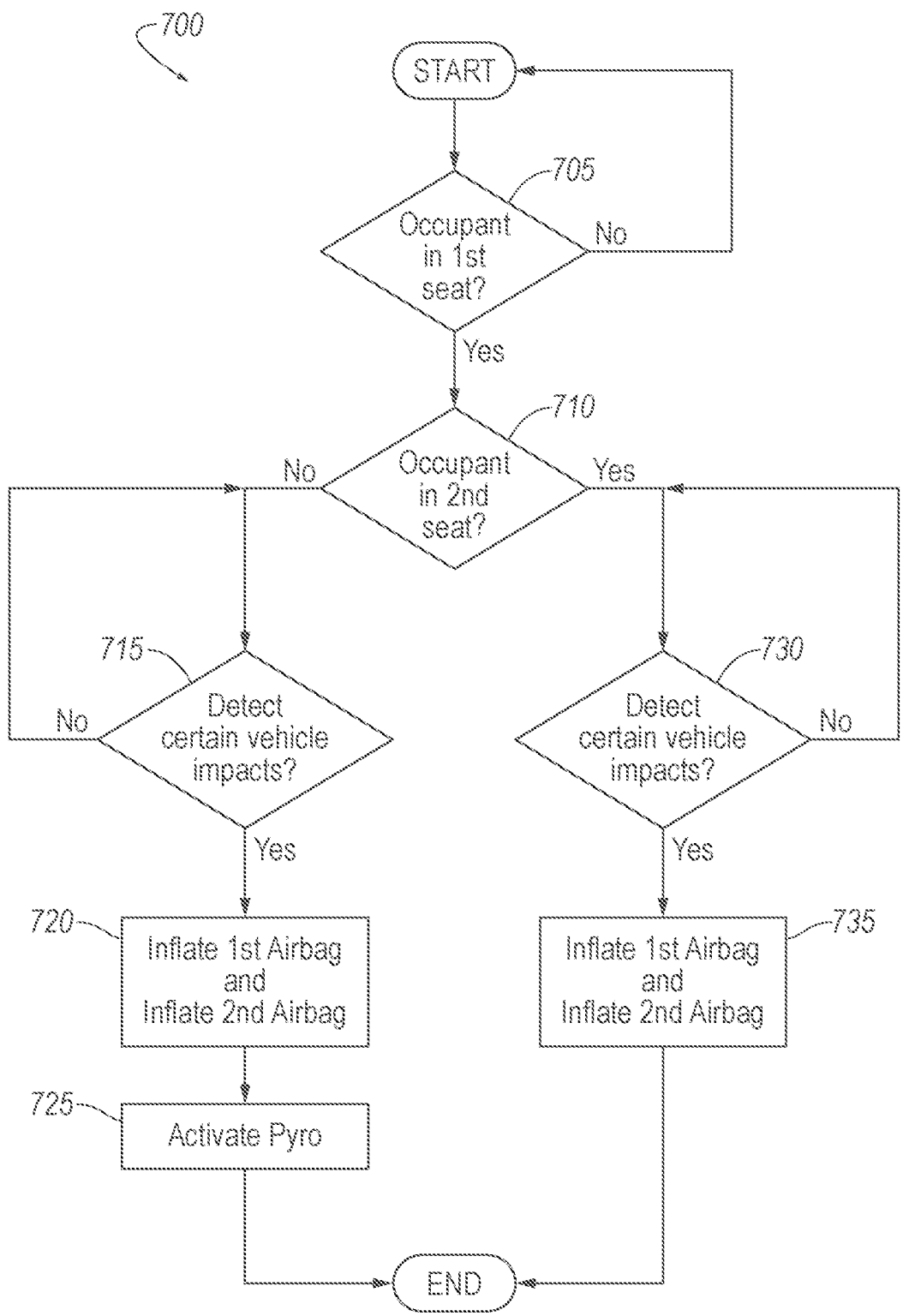
FIG. 7 is a flowchart of a method executable by a vehicle computer.

With reference to FIG. 7, the vehicle computer 68 stores instructions to control components of the vehicle 12 according to the method 700. Specifically, the method includes identifying occupancy of the first seat 14 and the second seat 16 to determine activation of the pyrotechnic retractor 24 based on the occupancy. Use of "in response to," "based on," and "upon determining" herein indicates a causal relationship, not merely a temporal relationship.

With reference to decision block 705, the method includes identifying that an occupant is seated in the first seat 14. The occupancy sensors 70 may send a signal to the vehicle computer 68 to indicate an occupant in the first occupant-seating area 40 of the first seat 14. If no occupant is identified in the first seat 14, the method returns to its start. If an occupant is identified in the first seat 14, the method moves to decision block 710.

With reference to decision block 710, the method includes identifying that an occupant is seated in the second seat 16. The occupancy sensors 70 may send a signal to the vehicle computer 68 to indicate an occupant in the second occupant-seating area 42 of the second seat 16. If no occupant is identified in the second seat 16, the method moves to decision block 715. If an occupant is identified in the second seat 16, the method moves to decision block 735.

With reference to decision block 715, based on identification of no occupant seated in the second seat 16, the method includes detecting certain vehicle impacts, e.g., certain side vehicle impacts. The impact sensors 80 may detect certain vehicle impacts and may send a signal to the vehicle computer 68 indicating the vehicle impact. If no vehicle impact is detected, the method returns to decision block 715. If a vehicle impact is detected, the method moves to decision block 720.

With reference to block 720, in response to detection of certain vehicle impacts, the method includes inflating the first airbag 18 and the second airbag 20 to the inflated positions. The vehicle computer 68 may send a signal to the first inflator and the second inflator 52 to fill the airbags 18, 20 with inflation medium until the airbags 18, 20 reach the inflated position.

With reference to block 725, based on identification of an occupant seated in the first seat 14 and lack of identification of an occupant seated in the second seat 16, the method includes activating the pyrotechnic retractor 24 to move the distal end 22 of the second airbag 20 toward the first airbag 18. The vehicle computer 68 may send a signal to the pyrotechnic retractor 24 to activate the pyrotechnic retractor 24. The pyrotechnic retractor 24 retracts the first tether to the retracted position to move the distal end 22 toward the first airbag 18. The method ends after block 725.

With reference to decision block 730, based on identification of an occupant seated in the second seat 16, the method includes detecting certain vehicle impacts, e.g., certain side vehicle impacts. The impact sensors 80 may detect certain vehicle impacts and may send a signal to the vehicle computer 68 indicating the vehicle impact. If no vehicle impact is detected, the method returns to decision block 735. If a vehicle impact is detected, the method moves to decision block 720.

With reference to block 735, based on identification of an occupant seated in the first seat 14 and the second seat 16 and detection of certain vehicle impacts, the method includes inflating the first airbag 18 and the second airbag 20 to the inflated positions. The vehicle computer 68 may send a signal to the first inflator 50 and the second inflator 52 to fill the airbags 18, 20 with inflation medium until the airbags 18, 20 reach the inflated position. The method ends after block 735.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
a first seat and a second seat spaced from the first seat;
a first airbag inflatable between the first seat and the second seat from an uninflated position to an inflated position, the first airbag being supported by the first seat in the uninflated position and the inflated position;
a second airbag inflatable between the first seat and the second seat from an uninflated position to an inflated position, the second airbag being supported by the second seat in the uninflated position and the inflated position;
the second airbag including a distal end spaced from the second seat in a seat-forward direction; and
a pyrotechnic retractor supported by the second seat, the pyrotechnic retractor operatively coupled to the distal end of the second airbag to move the distal end of the second airbag toward the first airbag.

2. The assembly of claim 1, further comprising a tether extending from the pyrotechnic retractor and connected to the distal end of the second airbag, the tether being retractable from an extended position to a retracted position by the pyrotechnic retractor.

3. The assembly of claim 2, wherein the tether is configured to move the distal end seat-outboard as the tether moves from the extended position to the retracted position.

4. The assembly of claim 2, wherein the tether is configured to move the distal end seat-rearward as the tether moves from the extended position to the retracted position.

5. The assembly of claim 2, wherein the second airbag defines an inflation chamber, the tether being external to the inflation chamber.

6. The assembly of claim 2, wherein the tether is between the first airbag and the second airbag when the airbags are in the inflated positions.

7. The assembly of claim 2, wherein the second airbag includes a seat-inboard side and a seat-outboard side spaced from the seat-inboard side, the tether extending along the seat-outboard side in the extended position.

8. The assembly of claim 7, further comprising a second tether extending from the second seat to the seat-inboard side of the second airbag, the second tether being fixed relative to the second seat and the seat-inboard side of the second airbag.

9. The assembly of claim 2, wherein the second airbag includes a flap connected to the distal end, the tether extending from the flap to the pyrotechnic retractor.

10. The assembly of claim 1, further comprising a tether extending from the second seat to the second airbag, the tether being fixed relative to the second seat and the second airbag.

11. The assembly of claim 1, further comprising a middle console between the first seat and the second seat, the first airbag and the second airbag being inflatable above the middle console.

12. The assembly of claim 1, wherein the second seat includes a seatback, the pyrotechnic retractor being supported by the seatback of the second seat.

13. The assembly of claim 1, wherein the first seat and the second seat each include a seatback, the airbags being inflatable between the seatbacks of the first seat and the second seat.

14. The assembly of claim 13, wherein the seatback of the second seat includes a seatback frame, the pyrotechnic retractor being supported by the seatback frame.

15. The assembly of claim 14, wherein the seatback frame of the second seat includes a seat-forward side and a seat-rearward side, the pyrotechnic retractor being fixed to the seat-rearward side of the seatback frame of the second seat.

16. The assembly of claim 15, further comprising a tether extending from the seat-forward side of the seatback frame to the second airbag, the tether being fixed to the seat-forward side of the seatback frame and to the second airbag.

17. The assembly of claim 16, wherein the pyrotechnic retractor being coupled to the second airbag at a first position and the tether being fixed to the second airbag at a second position, the first position being spaced from the second position along the second airbag.

18. The assembly of claim 1, further comprising a computer including a processor and a memory storing instructions executable by the processor to:
   identify that an occupant is seated in the first seat;
   identify that an occupant is seated in the second seat;
   inflate the first airbag and the second airbag to the inflated positions in response to certain vehicle impacts; and
   based on identification of an occupant seated in the first seat and lack of identification of an occupant seated in the second seat, activate the pyrotechnic retractor to move the distal end of the second airbag toward the first airbag.

19. The assembly of claim 18, wherein the instructions include to not actuate the pyrotechnic retractor based on identification of an occupant seated in the first seat and an occupant seated in the second seat.

* * * * *